US012766988B2

(12) United States Patent
Lee et al.

(10) Patent No.: US 12,766,988 B2
(45) Date of Patent: Oct. 20, 2026

(54) ELECTRIC VEHICLE CABLE MOUNTING SYSTEM AND METHOD THEREFOR

(71) Applicants: HYUNDAI MOTOR COMPANY, Seoul (KR); KIA CORPORATION, Seoul (KR)

(72) Inventors: Woo Hyung Lee, Uijeongbu-si (KR); Seung Tack Hong, Seoul (KR); Ho Choi, Seoul (KR); Young Tae Choi, Gwacheon-si (KR); Hyun Gu Lee, Seoul (KR); Su Hwan Cho, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 847 days.

(21) Appl. No.: 18/117,564

(22) Filed: Mar. 6, 2023

(65) Prior Publication Data

US 2024/0123851 A1 Apr. 18, 2024

(30) Foreign Application Priority Data

Oct. 14, 2022 (KR) ........................ 10-2022-0132491

(51) Int. Cl.
*B60L 53/35* (2019.01)
*B60L 53/18* (2019.01)
*B65H 75/36* (2006.01)

(52) U.S. Cl.
CPC ............... *B60L 53/35* (2019.02); *B60L 53/18* (2019.02); *B65H 75/362* (2013.01); *B65H 75/368* (2013.01); *B65H 2404/10* (2013.01); *B65H 2513/10* (2013.01); *B65H 2557/264* (2013.01); *B65H 2701/34* (2013.01)

(58) Field of Classification Search
CPC ....... B60L 53/18; B60L 53/35; B65H 75/362; B65H 75/368; B65H 2404/10; B65H 2513/10; B65H 2557/264; B65H 2701/34
See application file for complete search history.

(56) References Cited

U.S. PATENT DOCUMENTS

2022/0314826 A1* 10/2022 Niwa ...................... B60L 53/31

FOREIGN PATENT DOCUMENTS

| | | | | | |
|---|---|---|---|---|---|
| JP | 2012-039743 | A | | 2/2012 | |
| KR | 2019-0130896 | A | | 11/2019 | |
| KR | 10-2101479 | B1 | | 5/2020 | |
| KR | 2020-0109994 | A | | 9/2020 | |
| KR | 20210124798 | A | * | 10/2021 | ............. H02G 11/02 |

* cited by examiner

*Primary Examiner* — Robert J McCarry, Jr.
(74) *Attorney, Agent, or Firm* — MCDONNELL BOEHNEN HULBERT & BERGHOFF LLP

(57) ABSTRACT

A electric vehicle cable mounting system includes a driving unit including a rotary disc and allowing a charging cable to be released from a side in accordance with a rotation motion of a rotary disc, a guide unit provided behind the driving unit and allowing the driving unit to move in a vertical direction in accordance with a rotation motion of the rotary disc, and a controller controlling the driving unit and the guide unit such that the charging cable is automatically released in an electric vehicle charge mode and is automatically returned in an electric vehicle charge standby mode.

14 Claims, 7 Drawing Sheets

<CHARGE STANDBY> <IN CHARGING>

<CHARGE STANDBY> <IN CHARGING>

ELECTRIC VEHICLE CABLE MOUNTING SYSTEM AND METHOD THEREFOR

CROSS REFERENCE TO RELATED APPLICATIONS

The present application claims priority of Korean Patent Application No. 10-2022-0132491 filed on Oct. 14, 2022, the entire contents of which is incorporated herein for all purposes by this reference.

BACKGROUND

Field of the Disclosure

The present disclosure relates to an electric vehicle cable mounting system and a method therefor and, in more detail, an electric vehicle cable mounting system that exposes only a portion of a charging cable to the outside in a charge standby mode of an electric vehicle and automatically releases the charging cable in a charge mode, and a method thereof.

Description of the Related Art

Recently, as environmental restrictions are enhanced and it is attempted to reduce energy costs, the demand for eco-friendly electric vehicles is increasing. In order to further popularize electric vehicles, it is necessary to construct a charging infrastructure that can charge electric vehicles.

An electric vehicle charger, which is an apparatus that supplies electrical energy supplied from a power source to the battery of an electric vehicle, includes a charging controller, a charge guide display for monitoring the state of charge of the electric vehicle, and a charging cable for connecting the charger to the battery of an electric vehicle in order to supply electrical energy supplied from a power source to the battery of an electric vehicle. According to such an electric vehicle charger, electrical energy can be supplied to the battery of an electric vehicle by connecting a charging connector at the end of the charging cable to a connection inlet installed at an electric vehicle.

A charging cable has a length of about 5 m, and is generally mounted or held on a holder disposed on a side of a charger and arranged or maintained in this state. In order to use such a charging cable, generally, users draw out and then use the charging cable.

In a charge standby mode in which an electric vehicle is not charged, it is not good in terms of external appearance due to a poor mounting structure of a charging cable, and the charging cable may be contaminated by foreign substances adhering to the charging cable. Further, in a charging mode in which an electric vehicle is charged, the degree of drawing-out of a charging cable is not adjusted to be fitted to vehicles, so excessive tension is generated in the charging cable, whereby a charging port or a coupler may be broken.

Accordingly, there is a need for a method of preventing a charging cable and a coupler from being broken in a charge standby mode and of automatically releasing the charging cable in a charge mode of a vehicle.

The description provided above as a related art of the present disclosure is just for helping understand the background of the present disclosure and should not be construed as being included in the related art known by those skilled in the art.

SUMMARY

An object of the present disclosure is to provide an electric vehicle charging cable mounting system that prevents a charging cable and a coupler from being contaminated and broken by keeping the charge cable only partially exposed to the outside in a charge standby mode of an electric vehicle and that automatically releases the charging cable in a charge mode so that convenience for customers is increased, and an electric vehicle cable mounting method.

The technical subjects to implement in the present disclosure are not limited to the technical problems described above and other technical subjects that are not stated herein will be clearly understood by those skilled in the art from the following specifications.

As a means for solving the technical subject, an electric vehicle charging cable mounting system includes a driving unit including a rotary disc and allowing a charging cable to be released from a side in accordance with a rotation motion of a rotary disc, a guide unit provided behind the driving unit and allowing the driving unit to move in an up-down direction in accordance with a rotation motion of the rotary disc, and a controller controlling the driving unit and the guide unit such that the charging cable is automatically released in an electric vehicle charge mode and is automatically returned in an electric vehicle charge standby mode.

For example, the controller may calculate a release amount of the charging cable on the basis of a distance between the driving unit and an electric vehicle charging section, and may allow the charging cable to be automatically released in accordance with the calculated release amount of the charging cable.

For example, the system may further include a plurality of guide rollers provided inside the driving unit, disposed in a circumferential direction in which the charging cable is released, and preventing separation of the charging cable.

For example, the system may further include a disc motor provided behind the driving unit and supplying power such that the rotary disc is rotated, wherein a rotation speed of the disc motor may be adjusted in accordance with a size of guide rollers and a release speed of the charging cable.

For example, the system may further include a guide motor provided over the guide unit and supplying power such that the driving unit is moved in the up-down direction in accordance with a rotation motion of the rotary disc, wherein a rotation speed of the guide motor is adjusted in accordance with rotation speed of the disc motor and the release speed of the charging cable.

For example, the system may further include a proximity sensor recognizing information of the kind of an electric vehicle when the electric vehicle approaches for charging.

For example, when the proximity sensor recognizes information of the kind of an electric vehicle, the controller may allow the charging cable to be automatically released in accordance with release amounts of the charging cable set in advance for the kinds of electric vehicles, respectively.

For example, the system may further include a load sensor sensing a load that is applied to the driving unit due to weight according to a release amount of the charging cable when the charging cable is released.

For example, the controller may determine whether a load sensed by the load sensor exceeds a reference value, and may stop release of the charging cable, depending on the determination result.

For example, the controller may recognize whether a coupler is separated in the state in which the coupler is mounted such that the charging cable is automatically released in the electric vehicle charge mode.

For example, the controller may recognize whether a coupler is mounted in the state in which the coupler is separated such that the charging cable is automatically returned in the electric vehicle charge standby mode.

As a method for solving the technical subject, the present disclosure configures a method of mounting an electric vehicle charging cable including a driving unit including a rotary disc and allowing a charging cable to be released from a side in accordance with a rotation motion of a rotary disc, and a guide unit provided behind the driving unit and allowing the driving unit to move in an up-down direction in accordance with a rotation motion of the rotary disc, the method including allowing the charging cable to be automatically released in an electric vehicle charge mode by controlling the driving unit and the guide unit by means of a controller, and allowing the charging cable to be automatically returned by means of the controller in an electric vehicle charge standby mode.

For example, the allowing of the charging cable to be automatically released may include calculating a release amount of the charging cable on the basis of a distance between the driving unit and an electric vehicle charging section by means of the controller, and allowing the charging cable to be automatically released in accordance with the calculated release amount of the charging cable by means of the controller.

For example, the allowing of the charging cable to be automatically released may include recognizing information of the kind of an electric vehicle by means of a proximity sensor when the electric vehicle approaches for charging, and allowing the charging cable to be automatically released in accordance with release amounts of the charging cable set in advance for the kinds of electric vehicles, respectively, when the proximity sensor recognizes information of the kind of an electric vehicle.

For example, the method may further include sensing a load that is applied to the driving unit due to weight according to a release amount of the charging cable by means of a load sensor when the charging cable is released, and determining whether a load sensed by the load sensor exceeds a reference value, and stopping release of the charging cable, depending on the determination result.

According to the electric vehicle cable mounting system and the method therefor, it is possible to prevent contamination and damage of a charging cable and a coupler by allowing only a portion of the charging cable to be exposed to the outside in the charging standby mode of an electric vehicle, and it is possible to increase convenience for customers by automatically releasing the charging cable in the charge mode.

The effects of the present disclosure are not limited to the effects described above and other effects can be clearly understood by those skilled in the art from the following description.

BRIEF DESCRIPTION OF THE FIGURES

The above and other objects, features and other advantages of the present disclosure will be clearly understood from the following detailed description when taken in conjunction with the accompanying drawings, in which.

DETAILED DESCRIPTION

Figure 1:
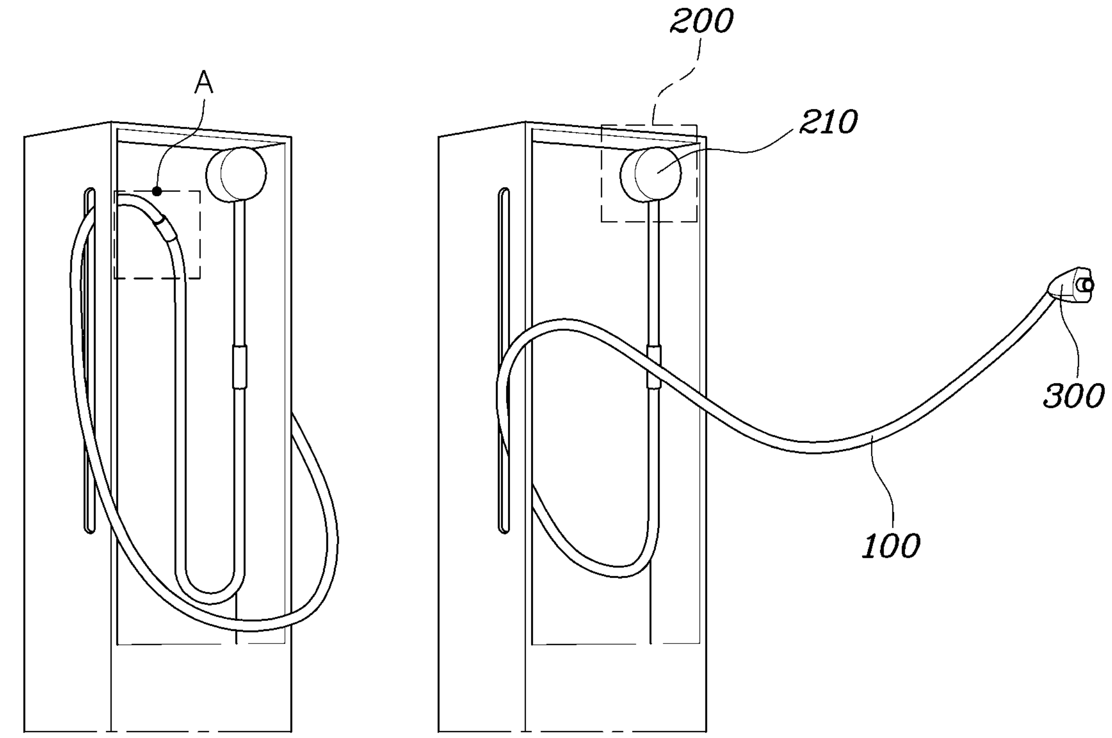
FIG. 1 is a view showing an electric vehicle charge standby mode and a charge mode of a charging cable mounting apparatus according to an embodiment of the present disclosure.

Hereafter, embodiments of the present disclosure will be described in detail with reference to the accompanying drawings and the same or similar components are given the same reference numerals regardless of the numbers of figures and are not repeatedly described.

Terms "module" and "unit" that are used for components in the following description are used only for the convenience of description without having discriminate meanings or functions.

In the following description, if it is decided that the detailed description of known technologies related to the present disclosure makes the subject matter of the embodiments described herein unclear, the detailed description is omitted. Further, the accompanying drawings are provided only for easy understanding of embodiments disclosed in the specification, the technical spirit disclosed in the specification is not limited by the accompanying drawings, and all changes, equivalents, and replacements should be understood as being included in the spirit and scope of the present disclosure. Terms including ordinal numbers such as "first", "second", etc., may be used to describe various components, but the components are not to be construed as being limited to the terms. The terms are used only to distinguish one component from another component.

It is to be understood that when one element is referred to as being "connected to" or "coupled to" another element, it may be connected directly to or coupled directly to another element or be connected to or coupled to another element, having the other element intervening therebetween. On the other hand, it should to be understood that when one element is referred to as being "connected directly to" or "coupled directly to" another element, it may be connected to or coupled to another element without the other element intervening therebetween.

Singular forms are intended to include plural forms unless the context clearly indicates otherwise.

It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Before describing an electric vehicle charging cable mounting system according to embodiments of the present disclosure, a schematic view in a charge standby mode and a charge mode that can be applied to the embodiments is described first.

FIG. 1 is a view showing an electric vehicle charge standby mode and a charge mode of a charging cable mounting apparatus 200 according to an embodiment of the present disclosure. Referring to the left figure in FIG. 1, a driving unit 210 to be described below is mounted on a fastening part A such that only a portion of a charging cable 100 is exposed to the outside, so it is possible to prevent damage by preventing the charging cable 100 from sliding on the floor, and simultaneously, it is possible to increase the brand image of a mounting system depending on convenience for customers. Referring to the right figure in FIG. 1, a coupler 300 can be released with the charging cable 100 on the basis of the distance between the driving unit 210 and an electric vehicle charging section, as will be described below, so it is possible to improve convenience for customers and prevent damage to an electric vehicle charging port.

Figure 2:
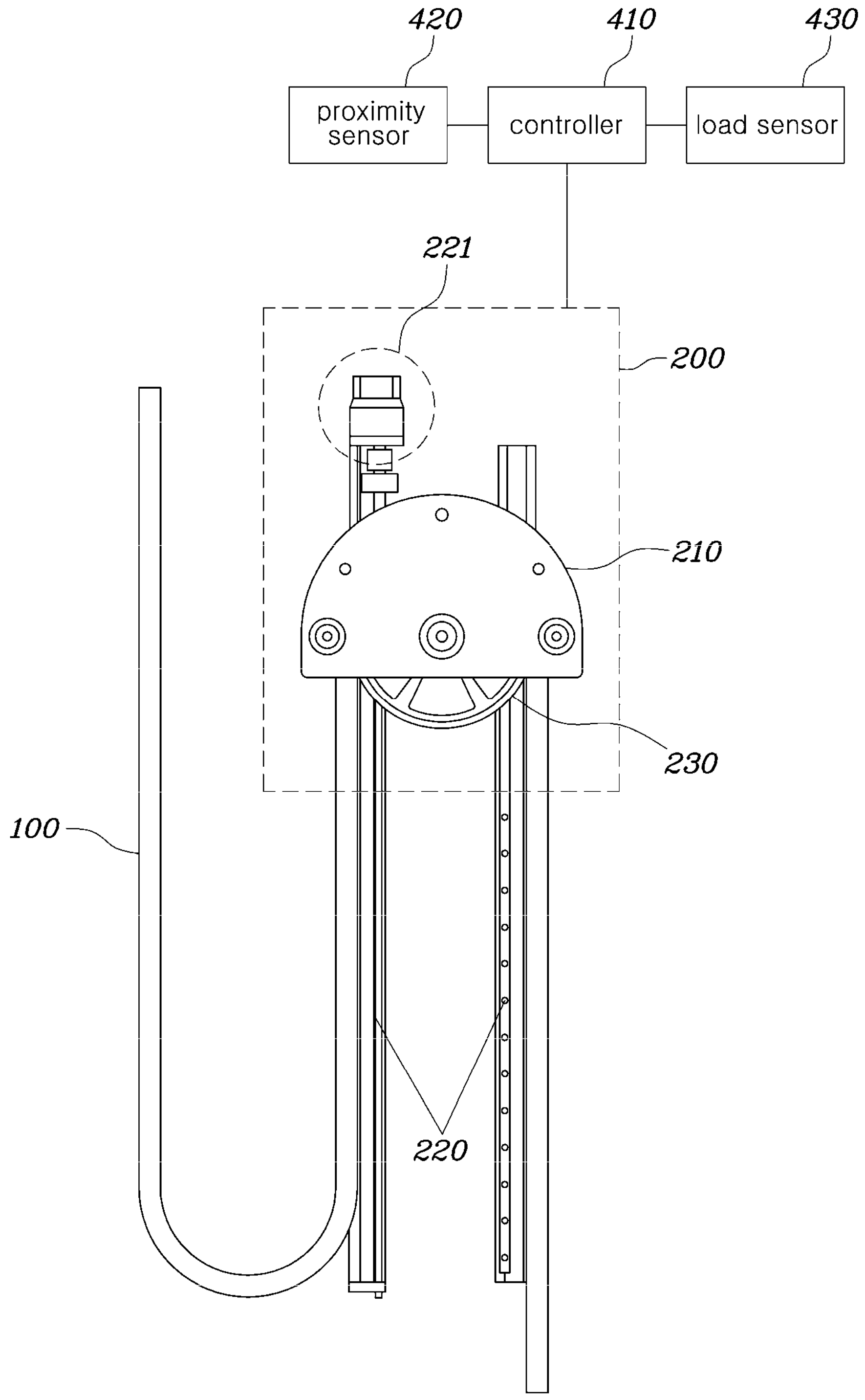
FIG. 2 is a view showing the configuration of an electric vehicle charging cable mounting system according to an embodiment of the present disclosure.
Figure 3:
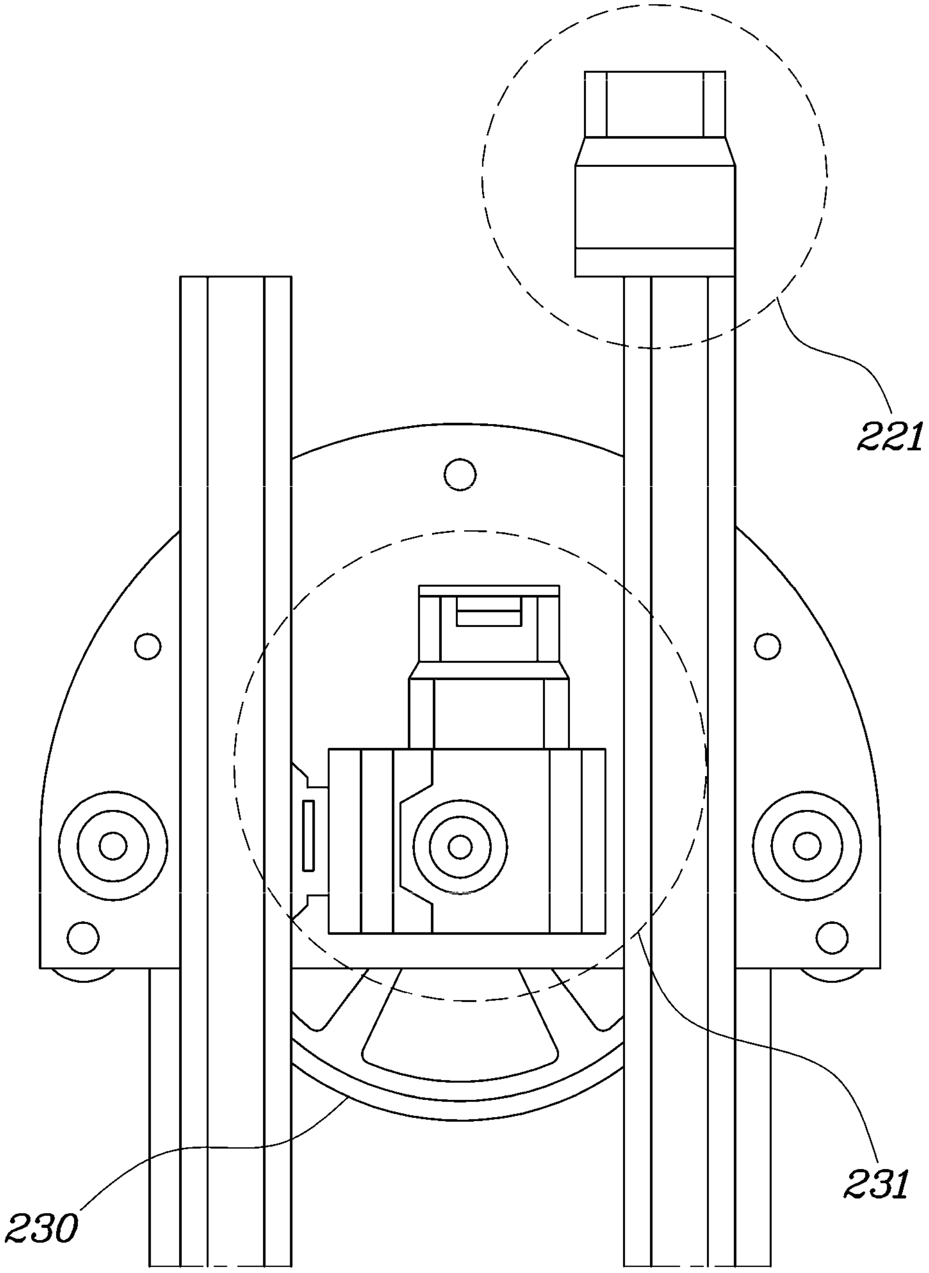
FIG. 3 is a view showing a driving unit according to an embodiment of the present disclosure.

FIG. 2 is a view showing the configuration of the electric vehicle charging cable 100 mounting system according to an embodiment of the present disclosure. Further, FIG. 3 is a view showing the driving unit 210 according to an embodiment of the present disclosure. FIGS. 2 and 3 mainly show components related to this embodiment and it is apparent that actually less or more components may be included to implement the electric vehicle charging cable 100 mounting system.

Referring to FIG. 2, the electric vehicle charging cable 100 mounting system may include a driving unit 210, a guide unit 220, and a controller 410.

The driving unit 210 has a rotary disc 230 and can allow the charging cable 100 to be released from a side in accordance with a rotation motion of the rotary disc 230. The driving unit 210 can be operated in accordance with a rotation motion of the rotary disc 230 that is supplied with power, and to this end, as shown in FIG. 3, a disc motor 231 is provided behind the driving unit 210, whereby it is possible to supply power such that the rotary disc 230 is rotated. The cable 100 may be designed to be released or returned in accordance with forward and backward rotation of the disc motor 231. In this configuration, the rotation speed of the disc motor 231 may be adjusted in accordance with the size of guide rollers 240 (shown in FIG. 4) and the release speed of the charging cable 100 to prevent the charging cable 100 from twisting and kinking when it is released or returned. The higher the release speed of the charging cable 100, the higher the rotation speed of the disc motor 231 is adjusted. Further, when the ratio of the size of the guide rollers 240 and the size of the rotary disc 230 is 1:4, the rotation speed ratio of the motor may be adjusted into 4:1.

The guide unit 220 is provided behind the driving unit 210 and can allow the driving unit 210 to move in the up-down (vertical) direction in accordance with a rotation motion of the rotary disc 230. A plurality of guide units 220 is provided in the up-down (vertical) direction, so it is possible to convert a rotation motion of the rotary disc 230 into a straight motion such that the driving unit 210 is straightly moved in the up-down direction. This process is achieved because the guide units 220 are supplied with power, and to this end, as shown in FIG. 2, a guide motor 221 is provided over the guide unit 220, so power can be supplied such that the driving unit 210 is moved in the up-down direction in accordance with a rotation motion of the rotary disc 230. The guide motor 221 is a part separate from the disc motor 231 and the rotation speed of the guide motor 221 can be adjusted in accordance with the rotation speed of the disc motor 231 and the release speed of the charging cable 100. The higher the rotation speed of the disc motor 231 and the release speed of the charging cable 100, the higher the rotation speed of the guide motor 221 is also adjusted.

Figure 4:
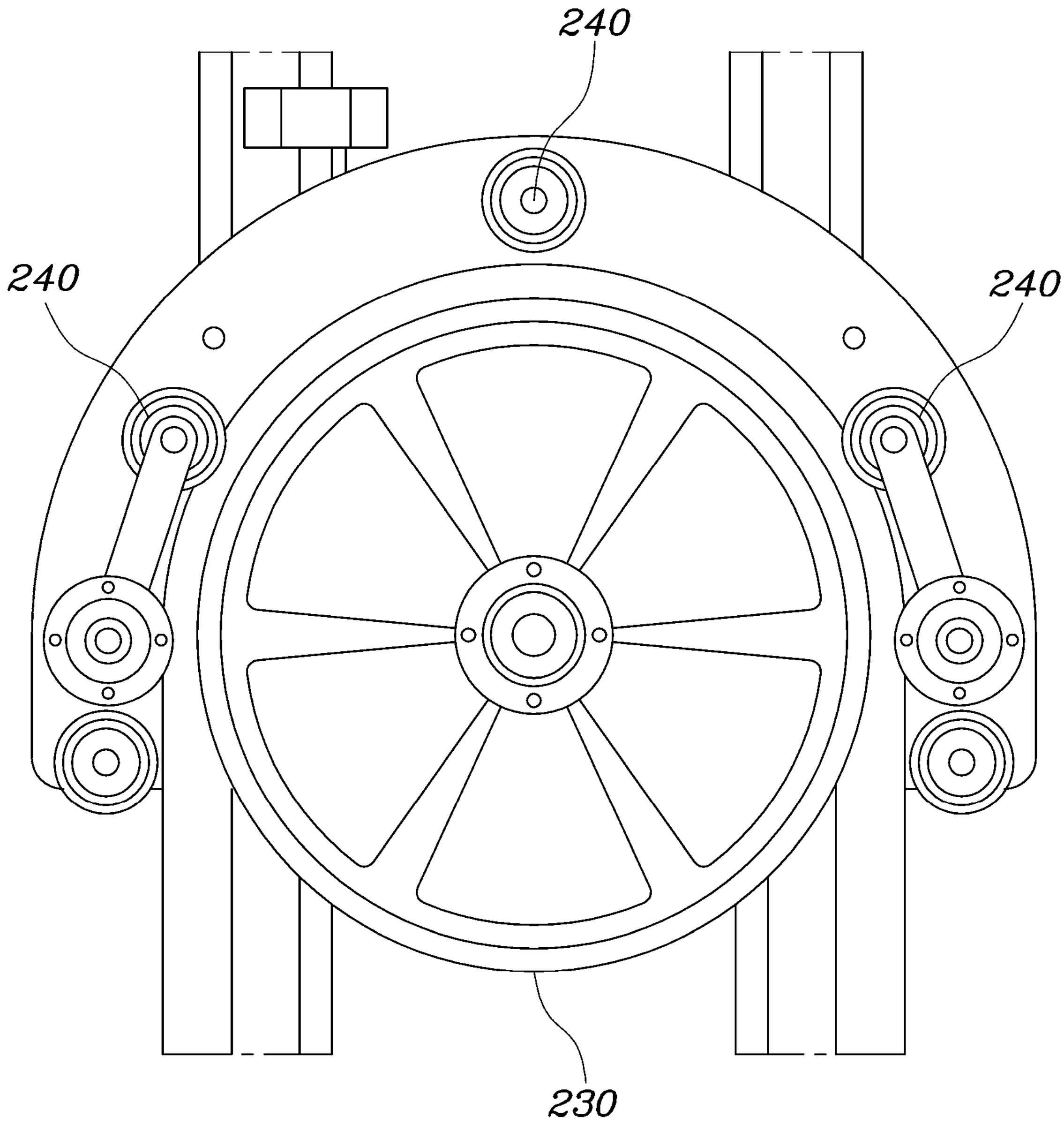
FIG. 4 is a view showing in detail guide rollers according to an embodiment of the present disclosure.

FIG. 4 is a view showing in detail the guide rollers 240 according to an embodiment of the present disclosure.

Referring to FIG. 4, a plurality of guide rollers 240 may be provided inside the driving unit 210 and may be disposed in a circumferential direction in which the charging cable 100 is released. The plurality of guide rollers 240 serves to prevent separation of the charging cable 100 and the cable 100 is released while rotating in the opposite direction to the rotation direction of the rotary disc 230 in the electric vehicle charge mode.

Meanwhile, the controller 410 can control the driving unit 210 and the guide unit 220 such that the charging cable 100 is automatically released in the electric vehicle charge mode and the charging cable 100 is automatically returned in the electric vehicle charge standby mode. In detail, the controller 410 controls the disc motor 231 and the guide motor 221.

Figure 5:
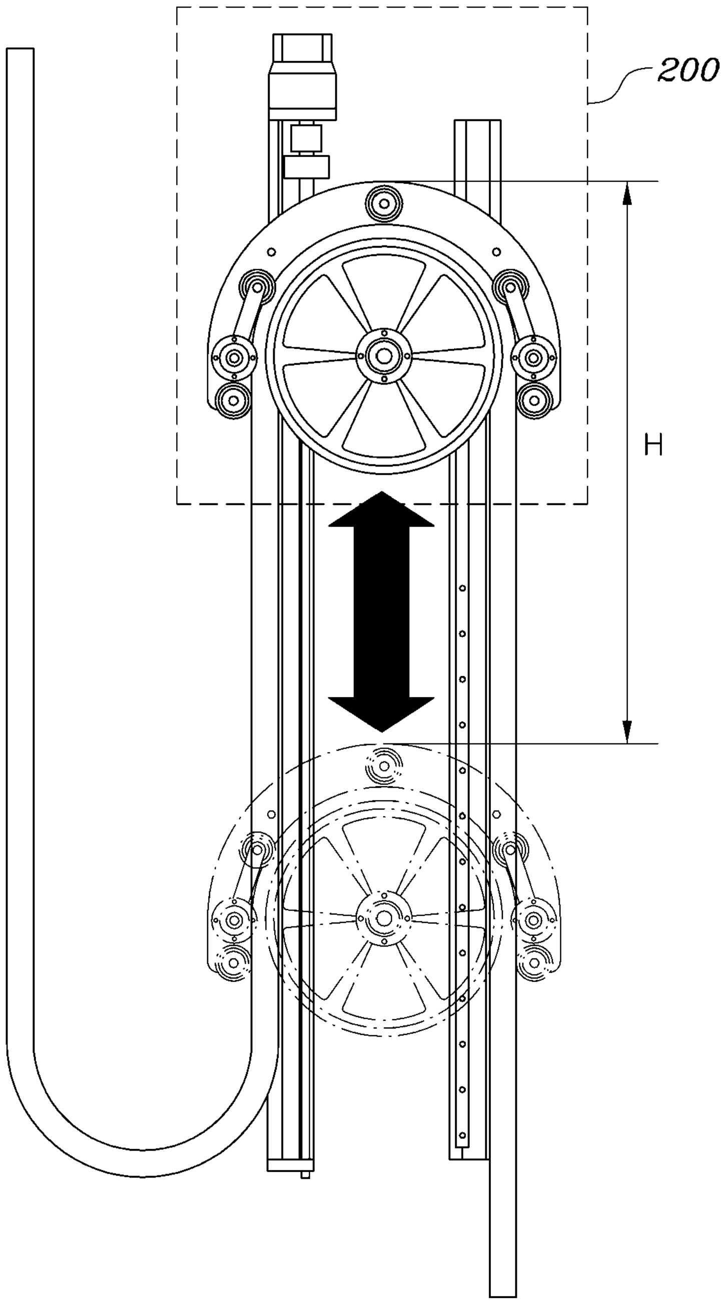
FIG. 5 is a view showing movement of the driving unit in the up-down direction according to a rotation motion of a rotary disc according to an embodiment of the present disclosure.

Hereafter, the release and return motions of the cable 100 according to driving of the disc motor 231 and the guide motor 221 are described. FIG. 5 is a view showing movement of the driving unit 210 in the up-down direction according to a rotation motion of the rotary disc 230 according to an embodiment of the present disclosure and FIG. 6 is a view showing a release direction of the charging cable 100 according to a rotation motion of the rotary disc 230 according to an embodiment of the present disclosure.

Figure 6:
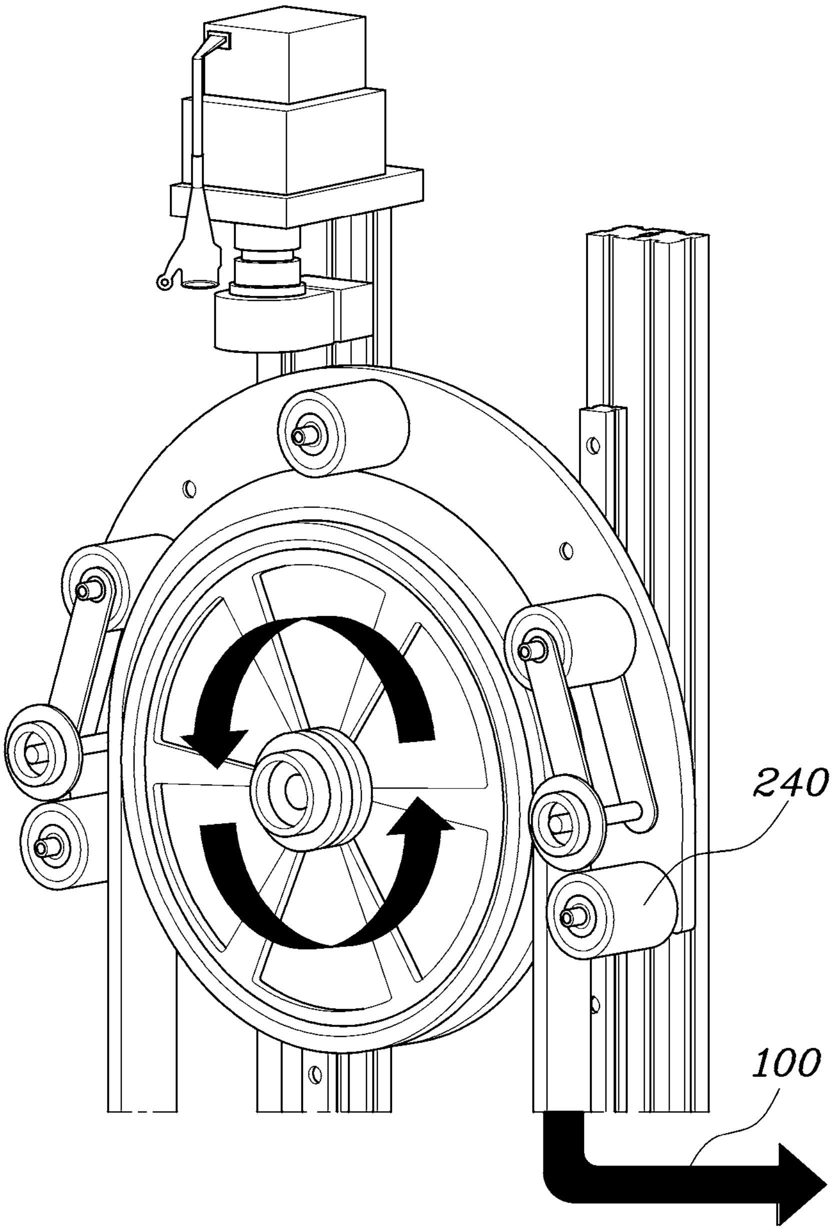
FIG. 6 is a view showing a release direction of a charging cable according to a rotation motion of the rotary disc according to an embodiment of the present disclosure.

Referring to FIGS. 5 and 6, the release motion of the cable 100 according to driving of the disc motor 231 and the guide motor 221 is as follows. First, the controller 410 can recognize whether the coupler 300 is separated in the state in which the coupler 300 is mounted such that the charging cable 100 is automatically released in the electric vehicle charge mode. When separation of the coupler 300 is recognized, the disc motor 231 is operated in a coupler 300 in about 2 seconds from the point in time at which the coupler 300 was separated from a coupler 300 storage box, and when the coupler is fastened to an electric vehicle charging port and CP voltage is changed from 12V to 9V or the disc motor 231 reaches a preset position of the cable mounting apparatus 200, release of the charging cable 100 can be stopped. In this case, the guide motor 221, similar to the disc motor 231, is operated in about 2 seconds from the point in time at which the coupler 300 was separated from the coupler 300 storage box such that the guide unit 220 is moved down, and when the driving unit 210 reaches a lowest point, release of the charging cable 100 can be stopped.

Meanwhile, the controller 410 can calculate the release amount of the charging cable 100 on the basis of the distance between the driving unit 210 and the electric vehicle charging section and can allow the charging cable 100 to be automatically released in accordance with the calculated release amount of the charging cable 100. Since the length of the charging cable 100 is limited, the controller 410 should calculate the release amount of the charging cable 100 in consideration of the positions of the charging port of every electric vehicle. For example, it is assumed that, in the electric vehicle charge standby mode, the outside exposure length of the charging cable 100 is 2.8 m and the maximum release amount of the charging cable 100 is 1.2 m. Accordingly, it is assumed that the length when the charging cable 100 is maximally released is 4 m. In this case, in Bongo or Porter EV, the charging port is positioned at the center of a driver seat side, so it is required to calculate the total release amount of the charging cable 100 high as about 4 m. Further, in Porsche Taycan, the charging port is positioned at the fender of the passenger seat side, so the release amount of the charging cable 100 should be calculated as about 3 m. Further, in a passenger EV, the charging port is positioned at the rear of the passenger seat side, charging is possible with the charging cable 100 in the charge standby mode.

On the contrary, the return motion of the cable 100 according to driving of the disc motor 231 and the guide motor 221 is as follows. First, the can recognize whether the coupler 300 is mounted in the state in which the coupler 300 is separated such that the charging cable 100 is automatically returned in the electric vehicle charge mode.

When mounting of the coupler 300 is recognized, the disc motor 231 is operated in about 5 seconds from the point in time at which the coupler 300 is mounted in the coupler 300 storage box, and can allow the rotary disc 230 to rotate backward in order to return the charging cable 100. In this case, when a proximity sensor 420 to be described below recognizes a specific position of the charging cable 100, return of the charging cable 100 can be stopped. In this case, the guide motor 221, similar to the disc motor 231, is operated in about 5 seconds from the point in time at which the coupler 300 was mounted in the coupler 300 storage box such that the guide unit 220 is moved up, and when the driving unit 210 reaches a highest point, return of the charging cable 100 can be stopped.

Further, the system may further include a proximity sensor 420 that can recognize information of the kind of an electric vehicle when an electric vehicle approaches for charging. The information of the kind of an electric vehicle includes distance information of the charging ports of electric vehicles and the controller (not shown) can secure the release amounts of the charging cable for the kinds of vehicles in advance in accordance with the information of the kinds of electric vehicles. Accordingly, the controller 410 can allow the charging cable 100 to be automatically released in accordance with the release amounts of the charging cable 100 secured in advance for the kinds of vehicles, so it is possible to increase convenience for customers, and simultaneously, it is possible to prevent damage to the charging cable 100 due to excessive tension.

Further, the system may further include a load sensor 430 that senses a load that is applied to the driving unit 210 due to the weight according to the release amount of the charging cable 100 when the charging cable 100 is released. When the release amount of the charging cable 100 is large and the load sensed by the load sensor 430 exceeds a reference value, the controller 410 can determine that the load is excessive and can stop release of the charging cable 100.

The proximity sensor 420 and the load sensor 430 described above are not shown in the figures, but it may be preferable that the proximity sensor 420 is provided at the cable mounting apparatus 200 to recognize information of the kinds of electric vehicles and the load sensor 430 is provided at the driving unit 210.

An electric vehicle charging cable 100 mounting method according to an embodiment is described with reference to FIG. 7 on the basis of the electric vehicle charging cable 100 mounting system.

Figure 7:
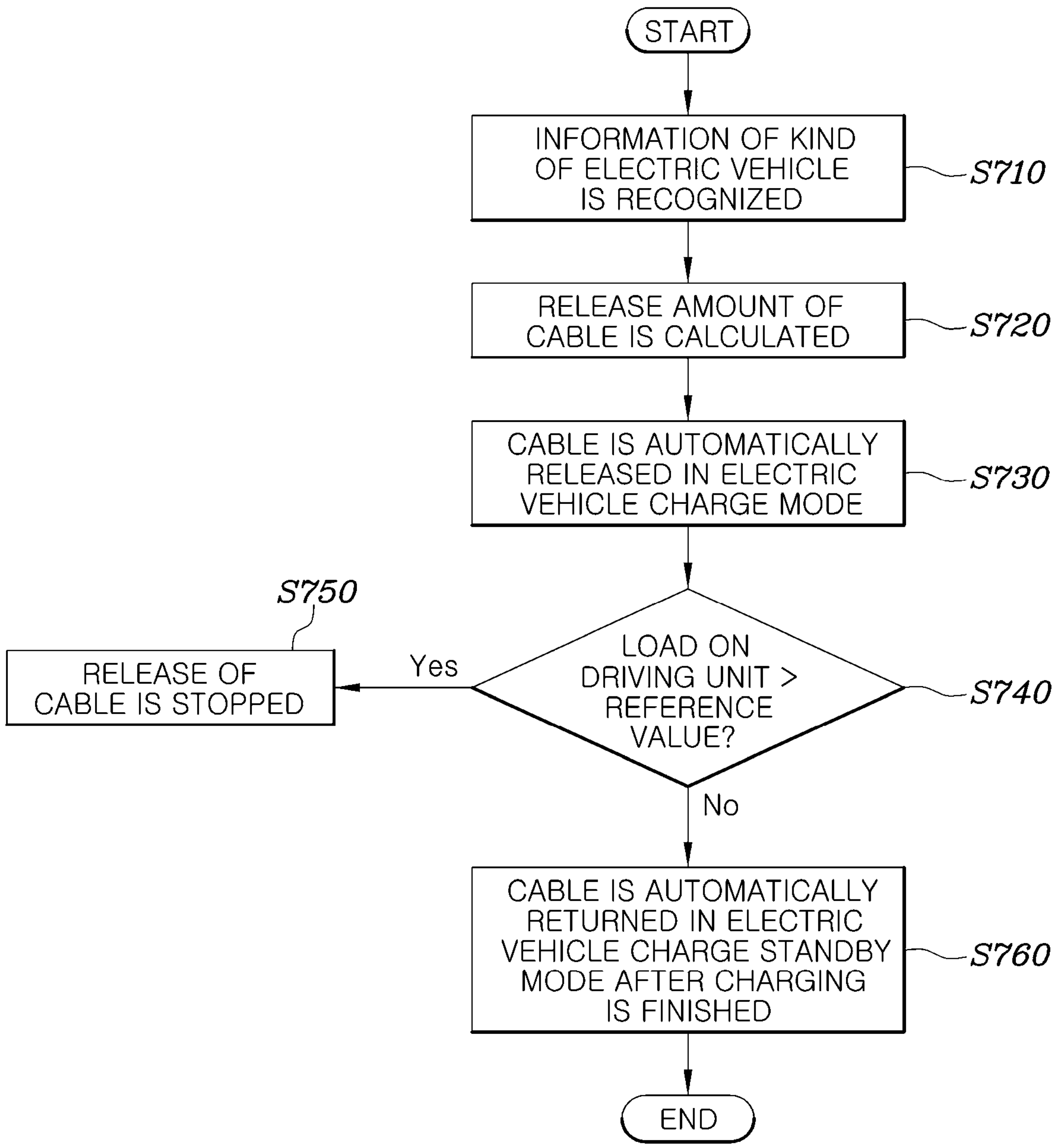
FIG. 7 is a view showing a process of mounting an electric vehicle charging cable according to an embodiment of the present disclosure.

FIG. 7 is a view showing a process of mounting the electric vehicle charging cable 100 according to an embodiment of the present disclosure.

Referring to FIG. 7, first, when an electric vehicle approaches for charging, the proximity sensor 420 can recognize the information of the kind of the electric vehicle at S710. When information of the kind of the electric vehicle is recognized, the controller 410 can calculate the release amount of the charging cable 100 on the basis of the distance between the driving unit 210 and the electric vehicle charging section at S720 and can allow the charging cable 100 to be automatically released in accordance with the release amount of the charging cable 100 calculated in the electric vehicle charge standby mode at S730. Thereafter, the controller 410 can determine whether a load is excessive in comparison to the reference value due to an excessive release amount of the charging cable 100 through the load sensor 430 at S740. When the release amount of the charging cable 100 is large and a load exceeds a reference value (YES in S740), the controller 410 can determine that the load is excessive and can stop release of the charging cable 100 at S750. On the contrary, when it is determined that a load is the reference value or less, the charging cable 100 keeps being released (NO in S740) and the controller 410 can allow the charging cable 100 to be automatically returned in the electric vehicle charge standby mode at S760.

According to the embodiment of the present disclosure described above, it is possible to prevent contamination and damage of a charging cable and a coupler by preventing the charging cable from being exposed to the outside in the charging standby mode of an electric vehicle, and it is possible to increase convenience for customers by automatically releasing the charging cable in the charge mode.

Although the present disclosure was provided above in relation to specific embodiments shown in the drawings, it is apparent to those skilled in the art that the present disclosure may be changed and modified in various ways without departing from the scope of the present disclosure, which is described in the following claims.

The invention claimed is:

1. An electric vehicle charging cable mounting system comprising:

a driving unit including a rotary disc, the driving unit being configured to allow the charging cable to be released from a side in accordance with a rotation motion of the rotary disc;

a guide unit positioned behind the driving unit, the guide unit being configured to allow the driving unit to move in a vertical direction in accordance with a rotation motion of the rotary disc; and a controller configured to control the driving unit and the guide unit such that the charging cable is automatically released in an electric vehicle charge mode and is automatically returned in an electric vehicle charge standby mode; and a load sensor configured to sense a load that is applied to the driving unit due to weight according to a release amount of the charging cable when the charging cable is released.

2. The electric vehicle charging cable mounting system of claim 1, wherein the controller is configured to calculate a release amount of the charging cable based on a distance between the driving unit and an electric vehicle charging section, and to allow the charging cable to be automatically released in accordance with the calculated release amount of the charging cable.

3. The electric vehicle charging cable mounting system of claim 1, further comprising a plurality of guide rollers positioned inside the driving unit, disposed in a circumferential direction in which the charging cable is released, and configured to prevent separation of the charging cable.

4. The electric vehicle charging cable mounting system of claim 3, further comprising a disc motor positioned behind the driving unit, the disc motor being configured to supply power such that the rotary disc is rotated;

wherein a rotation speed of the disc motor is adjusted in accordance with a size of guide rollers and a release speed of the charging cable.

5. The electric vehicle charging cable mounting system of claim 4, further comprising a guide motor positioned over the guide unit, the guide motor being configured to supply power such that the driving unit is moved in the vertical direction in accordance with a rotation motion of the rotary disc, wherein a rotation speed of the guide motor is adjusted in accordance with rotation speed of the disc motor and the release speed of the charging cable.

6. The electric vehicle charging cable mounting system of claim 1, further comprising a proximity sensor configured to recognize information of the kind of an electric vehicle when the electric vehicle approaches for charging.

7. The electric vehicle charging cable mounting system of claim 6, wherein when the proximity sensor recognizes information of the kind of an electric vehicle, the controller allows the charging cable to be automatically released in accordance with release amounts of the charging cable set in advance for the kinds of electric vehicles.

8. The electric vehicle charging cable mounting system of claim 1, wherein the controller determines whether the load sensed by the load sensor exceeds a reference value, and stops release of the charging cable, depending on the determination result.

9. The electric vehicle charging cable mounting system of claim 1, wherein the controller recognizes whether a coupler is separated in the state in which the coupler is mounted such that the charging cable is automatically released in the electric vehicle charge mode.

10. The electric vehicle charging cable mounting system of claim 1, wherein the controller recognizes whether a coupler is mounted in the state in which the coupler is separated such that the charging cable is automatically returned in the electric vehicle charge standby mode.

11. A method of mounting an electric vehicle charging cable including a driving unit having a rotary disc and allowing a charging cable to be released from a side in accordance with a rotation motion of a rotary disc, and a guide unit provided behind the driving unit and allowing the driving unit to move in a vertical direction in accordance with a rotation motion of the rotary disc, the method comprising:

allowing, by a controller, the charging cable to be automatically released in an electric vehicle charge mode by controlling the driving unit and the guide unit; and allowing the charging cable to be automatically returned by the controller in an electric vehicle charge standby mode; and sensing, by a load sensor, a load that is applied to the driving unit due to weight according to a release amount of the charging cable when the charging cable is released.

12. The method of claim 11, wherein allowing the charging cable to be automatically released includes:

calculating, by the controller, a release amount of the charging cable based on a distance between the driving unit and an electric vehicle charging section; and allowing, by the controller, the charging cable to be automatically released in accordance with the calculated release amount of the charging cable.

13. The method of claim 11, wherein allowing the charging cable to be automatically released includes:

recognizing, by a proximity sensor, information of the kind of an electric vehicle when the electric vehicle approaches for charging; and allowing the charging cable to be automatically released in accordance with release amounts of the charging cable set in advance for a plurality of kinds of electric vehicles, when the proximity sensor recognizes information of one of the plurality of kinds of electric vehicles.

14. The method of claim 11, further comprising:

determining whether a load sensed by the load sensor exceeds a reference value, and stopping release of the charging cable, when the load sensed by the load sensor exceeds the reference value.

* * * * *